United States Patent [19]

Shigemori

[11] Patent Number: 4,814,679
[45] Date of Patent: Mar. 21, 1989

[54] MOTOR SPEED CONTROL

[75] Inventor: Toshihiro Shigemori, Yokohama, Japan

[73] Assignee: Ricoh Company, Ltd., Tokyo, Japan

[21] Appl. No.: 130,651

[22] Filed: Dec. 9, 1987

[30] Foreign Application Priority Data

Dec. 10, 1986 [JP] Japan ................. 61-292584

[51] Int. Cl.$^4$ ............................................. H02P 5/00
[52] U.S. Cl. .................... 318/318; 318/310; 318/326
[58] Field of Search ............... 318/310, 311, 312, 314, 318/315, 318, 326

[56] References Cited

U.S. PATENT DOCUMENTS

| 3,543,112 | 11/1970 | Richmond | 318/310 X |
|---|---|---|---|
| 3,952,236 | 4/1976 | Hoover | 318/139 |
| 4,254,368 | 3/1981 | Ido et al. | 318/341 X |
| 4,543,516 | 9/1985 | Korobi et al. | 318/326 X |
| 4,668,900 | 5/1987 | Tabuchi | 318/327 X |
| 4,739,230 | 4/1988 | Sonobe et al. | 318/138 X |

FOREIGN PATENT DOCUMENTS 2587565  3/1987  France ..................... 318/314

Primary Examiner—Bentsu Ro
Attorney, Agent, or Firm—Oblon, Fisher, Spivak, McClelland & Maier

[57] ABSTRACT

A motor speed control applicable to an optical disk device and others includes a frequency converter for digitally comparing the frequency of a target speed signal and that of an actual speed signal. The outputs of the frequency converter are individually applied to frequency-to-voltage converters one of which is associated with the target speed and the other with the actual speed.

3 Claims, 6 Drawing Sheets

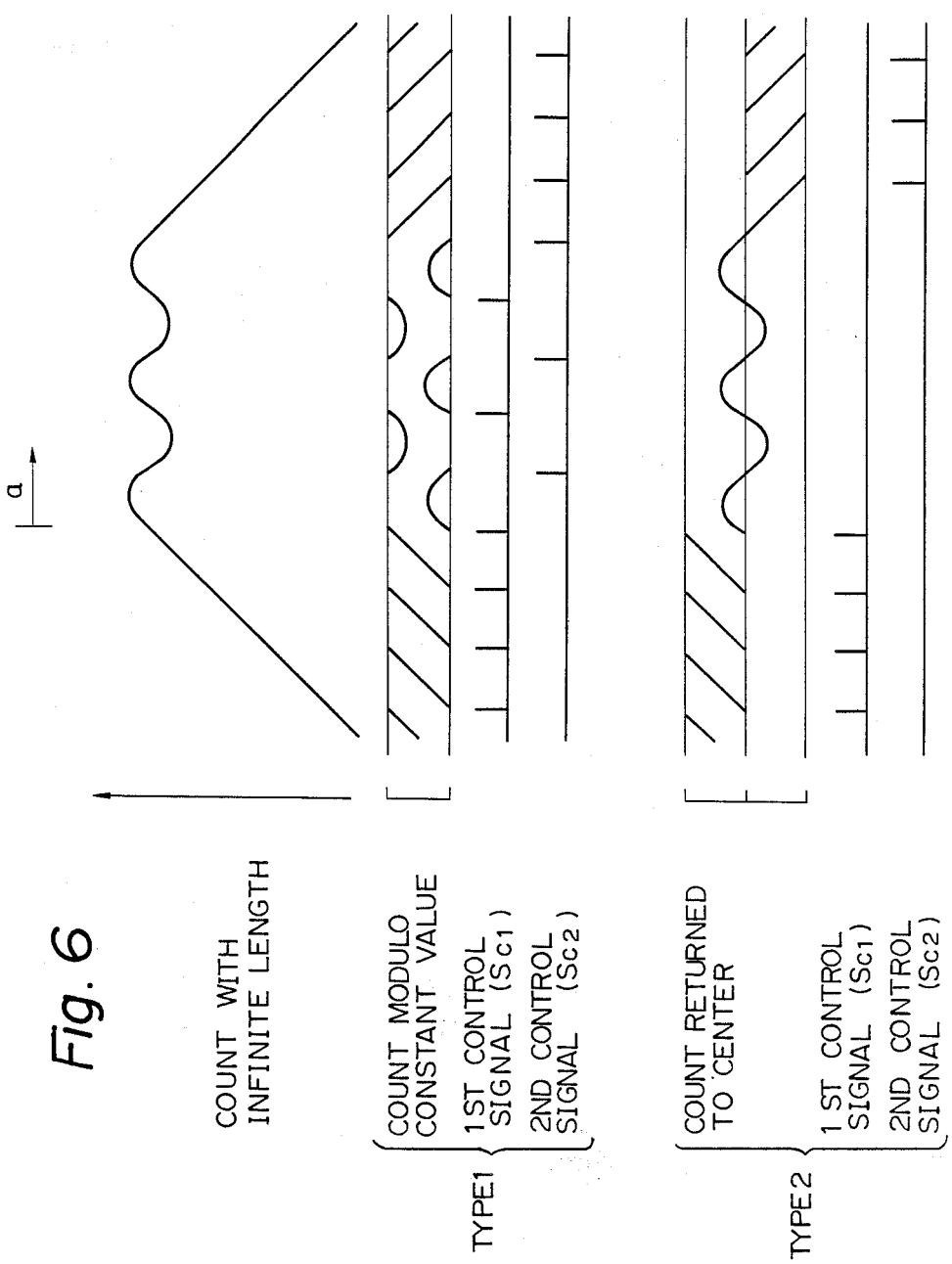

MOTOR SPEED CONTROL

BACKGROUND OF THE INVENTION

The present invention relates to a motor speed control and, more particularly, to a motor speed control which is applicable to an optical disk apparatus and others.

A motor speed control is adapted to control the speed of a motor to a predetermined object speed. In a motor speed control known in the art, a frequency proportional to an object speed and a frequency proportional to a real speed detected are converted into voltages by individual frequency-to-voltage converters, so that a difference between the object and real speeds is determined based on the difference between the two voltages. Such a difference in speed is added to a difference in phase between the object and real speeds so as to control the motor to the object speed based on the sum. However, the prior art motor speed control has a problem which is ascribable to the non-linearity, scattering in conversion ratio and others of the frequency-to-voltage converters. Specifically, even when the object and real speeds are equal to each other, a difference is developed between the outputs of those converters resulting in detection errors.

SUMMARY OF THE INVENTION

It is, therefore, an object of the present invention to provide an accurate motor speed control.

It is another object of the present invention to provide a motor speed control which eliminates detection errors ascribable to the scattering in the characteristics of frequency-to-voltage converters which are adapted to convert frequencies individually proportional to an object and a real speed into voltages.

It is another object of the present invention to provide a generally improved motor speed control.

A motor speed control of the present invention comprises a target speed signal generator for generating a target speed signal at a rate per unit time which is proportional to a target speed, an actual speed detector for generating an actural speed signal at a rate per unit time which is proportional to an actual speed of a motor, a frequency converter for incrementing a count in response to the target speed signal and decrementing the count in response to the actual speed signal, generating a first control signal when the count is increased beyond a predetermined upper limit, and generating a second control signal when the count is decreased beyond a predetermined lower limit, a first frequency-to-voltage converter for generating a first voltage which is substantially proportional to the number of the first control signals generated per unit time, a second frequency-to-voltage converter for generating a second voltage which is substantially proportional to the number of the second control signals generated per unit time, and a differential amplifier for outputting a control voltage by detecting a difference between the first and second voltages, whereby a driving force applied to the motor is controlled by the control voltage to control the speed of the motor.

BRIEF DESCRIPTION OF THE DRAWINGS

The above and other objects, features and advantages of the present invention will become more apparent from the following detailed description taken with the accompanying drawings in which:

FIGS. 3 to 6 are charts demonstrating the operation of a frequency-to-voltage converter.

DESCRIPTION OF THE PREFERRED EMBODIMENT

Figure 1:
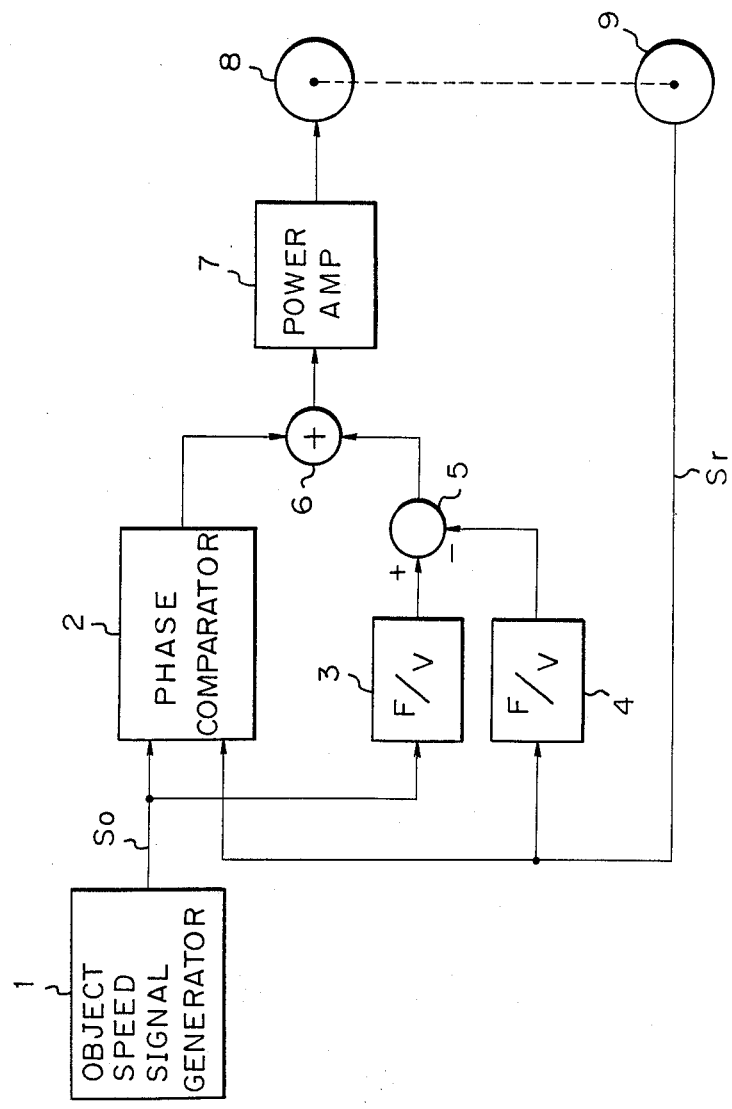
FIG. 1 is a schematic block diagram showing a prior art motor speed control.

To better understand the present invention, a brief reference will be made to a prior art motor speed control, shown in FIG. 1. As shown, the prior art motor speed control includes an object speed signal generator 1 for generating an object speed signal $S_o$ having a frequency which is proportional to an object speed. The object speed signal $S_o$ is applied to a phase comparator 2 and a first frequency-to-voltage (F/V) converter 3. The motor speed control also includes a speed detector 9 for detecting a real speed of a motor 8 whose speed is to be controlled. A real speed signal $S_y$ output by the speed detector 9 has a frequency which is proportional to an instantaneous speed of the motor 8, the signal $S_o$ being fed to the phase comparator 2 and a second F/V converter 4. The first F/V converter 3 converts the object speed signal $S_o$ into a voltage which is proportional to the frequency of the signal $S_o$. Likewise, the second F/V converter 4 converts the real speed signal $S_y$ into a voltage which is proportional to the frequency of the signal $S_y$. The output voltages of the first and second F/V converters 3 and 4 are applied to a differential amplifier 5 which produces a difference between the two voltages, i.e. a difference between the object speed signal $S_o$ and the real speed signal $S_y$. More specifically, the output voltage of the differential amplifier 5 is representative of a difference between the object speed and the real speed of the motor 8.

On the other hand, the phase comparator 2 compares the object speed signal $S_o$ and the real speed signal $S_y$ with respect to phase, producing a difference in phase between the object and real speeds. The output of the phase comparator 2 and that of the differential amplifier 5 are added by an adder 6. The sum produced by the adder 6 is suitably amplified by a power amplifer 7 and, then, fed to the motor 8 so as to control it to the object speed.

However, as previously discussed, since the F/V converters 3 and 4 have non-linearity, scattering in conversion ratios and others, their output voltages differ from each other even when the object and real speeds are equal to each other, resulting in detection errors.

Figure 2:
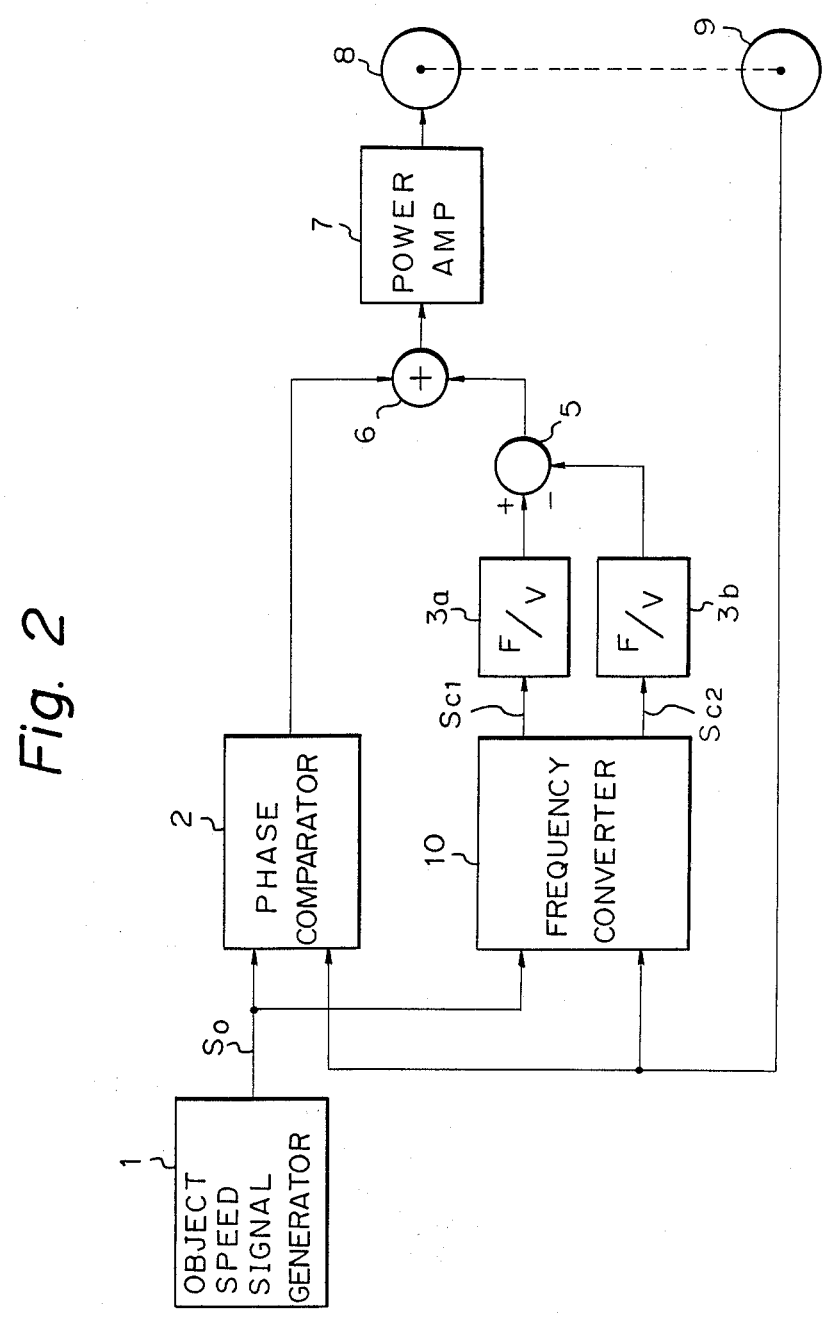
FIG. 2 is a schematic block diagram showing a motor speed control in accordance with the present invention.

Referring to FIG. 2, a motor speed control embodying the present invention is shown in a schematic block diagram. A characteristic feature of the present invention is that a first and a second F/V converters $3a$ and $4a$, respectively, are preceded by a frequency converter 10. In FIG. 2, the same or similar structural elements as those shown in FIG. 1 are designated by like reference numerals, and detailed description thereof will be omitted to avoid redundancy.

Figure 3:
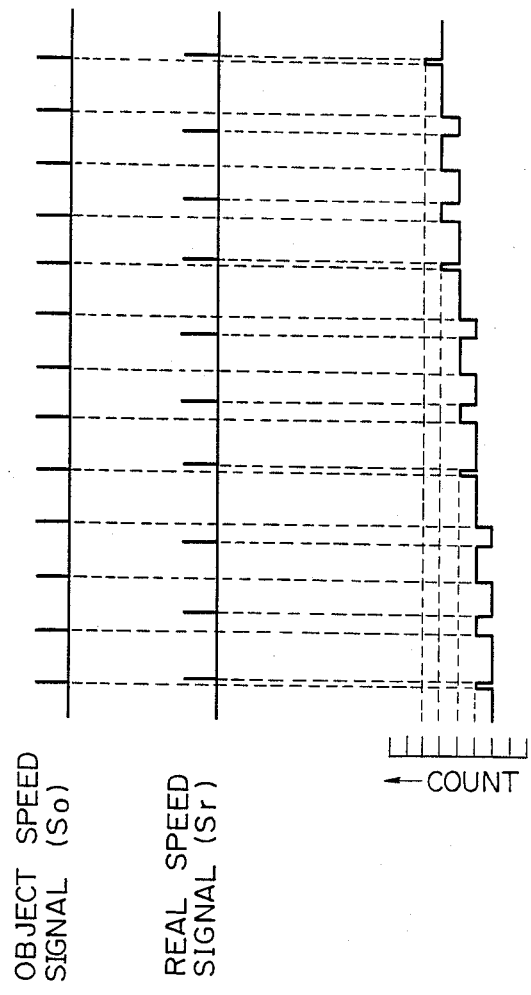

Applied to the frequency converter 10 are an object speed signal $S_o$ and a real speed signal $S_y$ which are output by an object speed signal generator 1 and a real speed signal generator 9, respectively. While the object speed signal $S_o$ has a frequency proportional to the object speed, the real speed signal $S_y$ has a frequency proportional to the real speed of the motor 8. The frequency converter 10 is constituted by a counter. As shown in FIG. 3, the counter is incremented by the object speed signal $S_o$ and decremented by the real speed signal $S_y$. Assuming that the count of the counter is infinite, it is representative of a phase difference between the orbect speed $S_o$ and the real speed $S_y$. Specifically, when the phase of the real speed signal $S_y$ is delayed relative to that of the object speed signal $S_o$ as shown in FIG. 3, the count of the counter is incremented in association with the phase difference. Also, with the above assumption, it is regarded that the variation of the count per unit time is representative of a frequency difference between the two signals $S_o$ and $S_y$.

Figure 4:
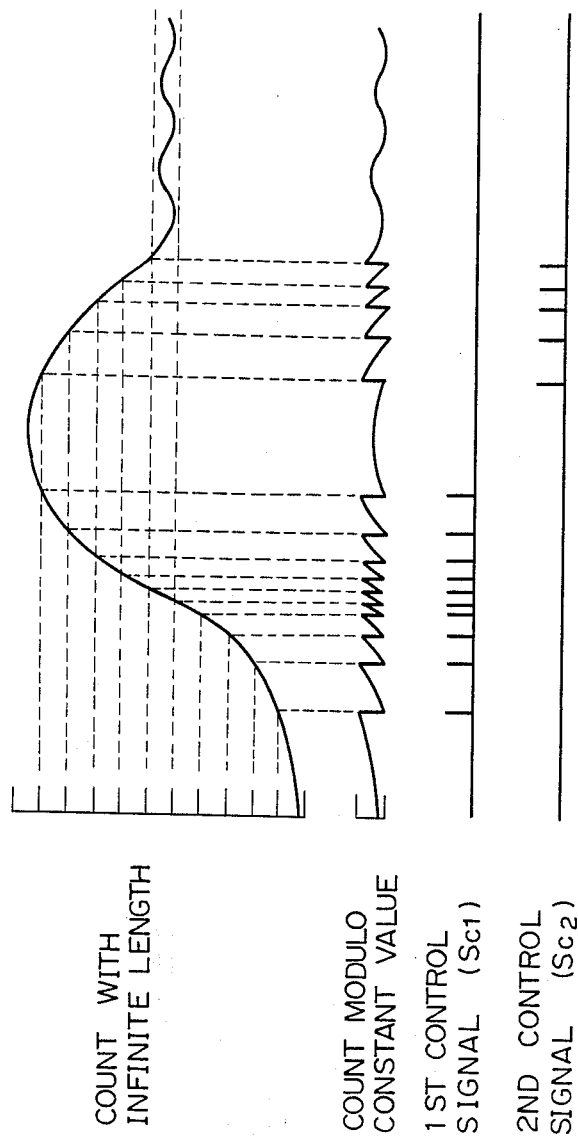

Assume that the frequency converter 10 is implemented with, instead of the counter having an infinite count as stated above, a counter which counts modulo a certain constant value, generates a first control signal $S_{c1}$ when a figure-up occurs, and generates a second control signal $S_{c2}$ when a figure-down occurs. Then, the first and second control signals $S_{c1}$ and $S_{c2}$ are produced at a ratio which is proportional to the variation of count modulo the constant value per unit time. Specifically, the count provided modulo a certain constant value is varied as shown in FIG. 4 in contrast to the infinite count. The first control signal $S_{c1}$ is produced when the frequency difference between the object and real speed signals $S_o$ and $S_y$ is positive, with a frequency proportional to the frequency difference. The second control signal $S_{c2}$ is produced when the frequency difference between the two signals $S_o$ and $S_y$ is negative, with a frequency proportional to the frequency difference. While no frequency difference is developed between the two signals $S_o$ and $S_y$, none of the control signals $S_{c1}$ and $S_{c2}$ is produced.

It is to be noted that in FIG. 4 the count is shown as varying along a curve although it in practice should change stepwise as shown in FIG. 3. This is to facilitate an understanding of the operation of the counter.

The first and second control signals $S_{c1}$ and $S_{c2}$ which are output by the frequency converter 10 as described above are fed to the first and second F/V converters 3a and 4a, respectively. The output voltages of the F/V converters 3a and 4a are applied to a differential amplifier 5 to produce a difference between the two voltages. Consequently, the differential amplifier 5 outputs a voltage which is proportional to a frequency difference beween the object and real speed signals $S_o$ and $S_y$. While no frequency difference exists between the object and real speed signals $S_o$ and $S_y$, the frequency converter 10 does not output any of the control signals $S_{c1}$ and $S_{c2}$ so that both of the outputs of the F/V converters 3a and 4a are zero. In this manner, the voltage difference between the F/V converters 3a and 4a becomes zero without being affected by the non-linearity, scattering in conversion rate and others of the converters 3a and 4a, eliminating the detection errors particular to the prior art as discussed earlier.

Figure 5:
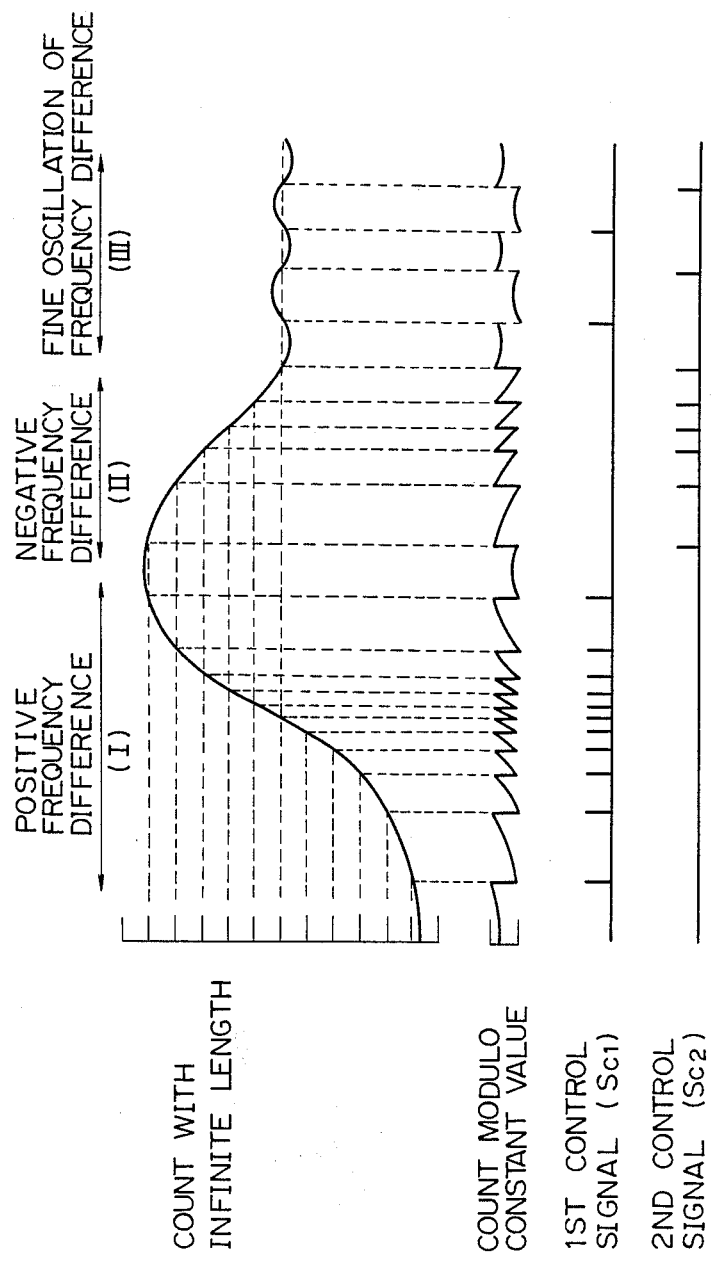

FIG. 5 shows another example in which although the count is varied in the same manner as in FIG. 4, the initial value of the count is different from that of FIG. 4. As shown in FIG. 5, in frequency ranges (I) and (II) in which the frequency difference between the object and real speed signals $S_o$ and $S_y$ is positive and negative, respectively, the first and second control signals $S_{c1}$ and $S_{c2}$ are produced in a substantially equivalent condition to those of FIG. 4 although the timings of appearance are slightly different. However, when it comes to a range (III) in which the frequency difference undergoes fine oscillation, the control signals $S_{c1}$ and $S_{c2}$ do not appear in the case of FIG. 4 and do appear alternately in the case of FIG. 5. Specifically, when the count shows delicate changes in the vicinity of the upper limit or the lower limit of the count, there is a fear that the first and second control signals $S_{c1}$ and $S_{c2}$ appear despite that the frequency difference between the object and real speed signals $S_o$ and $S_y$ is almost zero.

Hereinafter, the counter of the type behaving as above described will be referred to as a type 1 counter, and a counter of the type in which after the count has exceeded the upper limit or the lower limit, the count is brought back to substantially the intermediate between the upper and lower limits will be referred to as a type 2 counter, for the sake of convenience.

FIG. 6 shows the operation of the type 1 counter and that of the type 2 counter in a contrastive manner. As shown, so long as the count is greately varied in one direction, the first and second control signals $S_{c1}$ and $S_{c2}$ are generated in exactly the same manner in both the type 1 counter and the type 2 counter. Assume a condition wherein the count is increased beyond the upper limit and, then, decreased before reaching the next upper limit by the same amount as it is increased (a time range $\alpha$ shown in FIG. 6). In this time range $\alpha$, while the count of the type 1 counter reaches the lower limit causing the second control signal $S_{c1}$ to appear, the control signal $S_{c2}$ does not appear in the type 2 counter.

As stated above, the generation of the control signals in the type 2 counter involves hysteresis due to the variation in the direction of count. When the count is continuously varied in the same direction, the type 2 counter apparently operates in the same manner as the type 1 counter which is operable module substantially ½ of the difference between the upper and lower limits of count. On the other hand, when the count is increased beyond the upper limit or the lower limit and, then, varied in the other direction, it does not reach the upper limit or the lower limit immediately. Hence, the generation of control signals ascribable to delicate changes of count as shown in FIG. 4 is eliminated.

In summary, it will be seen that the present invention provides a motor speed control which enhances accurate control over motor speeds by eliminating detection errors which are ascribable to the non-linearity, scattering in conversion rate and others of F/V converters.

Various modifications will become possible for those skilled in the art after receiving the teachings of the present disclosure without departing from the scope thereof.

What is claimed is:
1. A motor speed control comprising:
a target speed signal generator for generating a target speed signal at a rate per unit time which is proportional to a target speed;
an actual speed detector for generating an actual speed signal at a rate per unit time which is proportional to an actual speed of a motor;
a frequency converter for incrementing a count in response to said target speed signal and decrementing said count in response to said actual speed signal, generating a first control signal when said count is increased beyond a predetermined upper limit, and generating a second control signal when said count is decreased beyond a predetermined lower limit;

a first frequency-to-voltage converter for generating a first voltage which is substantially proportional to the number of said first control signals generated per unit time;

a second frequency-to-voltage converter for generating a second voltage which is substantially proportional to the number of said second control signals generated per unit time; and a differential amplifier for outputting a control voltage by detecting a difference between said first and second voltages;

whereby a driving voltage applied to the motor is controlled by said control voltage to control the speed of said motor.

2. A motor speed control as claimed in claim 1, wherein said count of said frequency converter is returned to said lower limit when increased beyond said upper limit and returned to said upper limit when decreased beyond said lower limit.

3. A motor speed control as claimed in claimed in claim 1, wherein said count of said frequency converter is returned to substantially the intermediate between said upper and lower limits when increased beyond said upper limit or decreased beyond said lower limit.

* * * * *